United States Patent [19]

Brendel

[11] Patent Number: 5,140,731
[45] Date of Patent: Aug. 25, 1992

[54] HYDROSTATICALLY SUPPORTED ROLL WITH A DAMPING DEVICE

[75] Inventor: Bernhard Brendel, Grefrath, Fed. Rep. of Germany

[73] Assignee: Eduard Küsters Maschinenfabrik GmbH & Co KG, Krefeld, Fed. Rep. of Germany

[21] Appl. No.: 622,158

[22] Filed: Dec. 5, 1990

Related U.S. Application Data

[63] Continuation of Ser. No. 372,540, Jun. 22, 1989, abandoned.

[30] Foreign Application Priority Data

Jun. 22, 1988 [DE] Fed. Rep. of Germany ....... 3820972

[51] Int. Cl.⁵ .............................................. B21B 13/02
[52] U.S. Cl. ................................ 29/116.2; 29/116.1; 29/113.2
[58] Field of Search ................. 29/113.1, 113.2, 116.1, 29/116.2; 384/99; 100/162 B, 168, 169, 170, 171; 248/562, 563, 636; 188/322.13, 297

[56] References Cited

U.S. PATENT DOCUMENTS

| | | | |
|---|---|---|---|
| 2,395,915 | 3/1946 | Specht | 92/49 |
| 2,553,810 | 5/1951 | Carlson | 188/94 |
| 3,994,367 | 11/1976 | Christ | 184/5 |
| 4,620,348 | 11/1986 | Guttinger | 29/116.2 |
| 4,856,157 | 8/1989 | Küsters | 29/116.2 |
| 4,858,292 | 8/1989 | Bühlman et al. | 29/116.2 |
| 4,984,343 | 1/1991 | Schrors | 29/116.2 |

FOREIGN PATENT DOCUMENTS

| | | |
|---|---|---|
| 1026609 | 6/1970 | Fed. Rep. of Germany . |
| 1461066 | 6/1977 | Fed. Rep. of Germany . |
| 3004916 | 2/1983 | Fed. Rep. of Germany . |
| 3802234 | 9/1988 | Fed. Rep. of Germany . |

*Primary Examiner*—Joseph M. Gorski
*Assistant Examiner*—S. Thomas Hughes
*Attorney, Agent, or Firm*—Kenyon & Kenyon

[57] ABSTRACT

A roll with a revolving hollow cylinder which forms the working roll circumference, and a stationary crosshead penetrating said hollow cylinder lengthwise and leaving clearance all around to the inner circumference of the hollow cylinder in which the hollow cylinder can shift radially as a whole, e.g., can drop under its own weight on to the top side of the crosshead. A damping element is provided to damp this sinking movement before contact is made. It features a piston which plunges into a cylinder filled with hydraulic fluid and initially open to the top. During the plunging action, the hydraulic fluid is displaced out of the cylinder and flows away, in a throttled state, between the piston and the cylinder and/or through especially provided choke bores, so that the damping effect is attained.

18 Claims, 2 Drawing Sheets

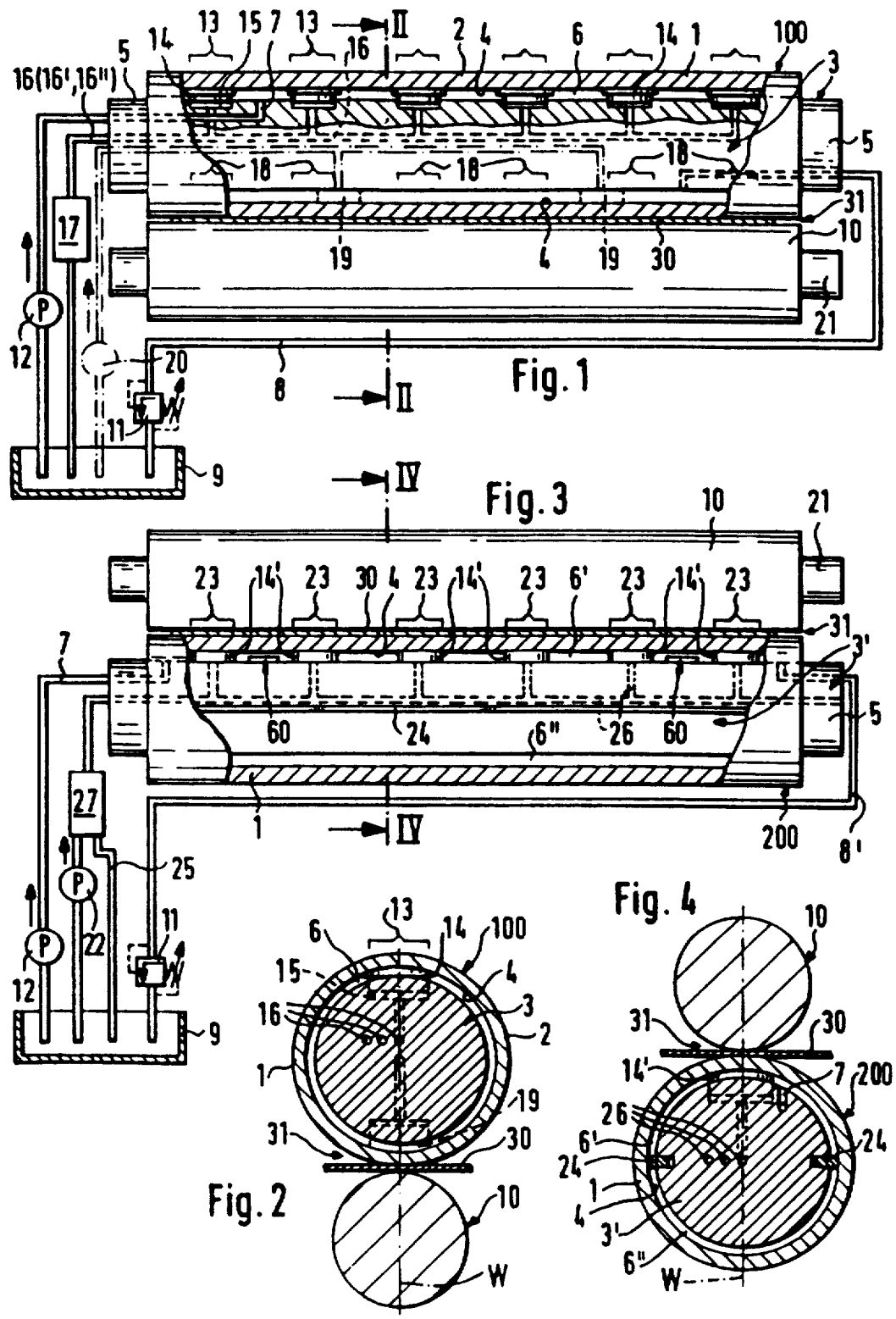

HYDROSTATICALLY SUPPORTED ROLL WITH A DAMPING DEVICE

This application is a continuation of application Ser. No. 07/372,540, filed Jun. 22, 1989, now abandoned.

BACKGROUND OF THE INVENTION

The invention relates generally to hydrostatically supported rolls and, more particularly, to an improved damping device for such a roll.

A roll with a rotatable hollow cylinder, which forms the working roll circumference, and a stationary crosshead penetrating the hollow cylinder lengthwise and leaving clearance all around to the inner circumference of the hollow cylinder, whereby the hollow cylinder is radially supported in an active plane on this crosshead by means of a supporting device and the hollow cylinder is radially movable as a whole opposite the crosshead and can be braked before contact is made, is disclosed in German patent No. 30 04 916, as the bottom roll of a calender. In the illustrated embodiment, the supporting device includes several piston-like supporting elements, which are arranged in rows along the crosshead and are movable in radial cylinder bores of the crosshead. The supporting elements abut against the inner circumference of the hollow cylinder with a hydrostatic bearing surface, in the direction of the roll nip. At its extremities, the hollow cylinder is supported in a guide ring, which can slide on the crosshead in a straight guide, parallel to the active plane of the roll. Depending on how far the piston-like supporting elements are pushed out of the cylinders in the crosshead, the hollow cylinder lifts itself as a whole opposite the crosshead, or it drops when the supporting elements descend.

The hollow cylinders of the type in question, which are used in paper industry applications, can have diameters of up to 1 m and lengths of up to 10 m. They can weigh up to 20 T. Therefore, components of substantial weight are concerned, which, in certain situations, can shift with considerable speed radially opposite the crosshead. The deformation energy stored in the deflected crosshead is also significant. When the load is suddenly removed, this deformation energy can cause the crosshead to spring back within the hollow cylinder. At this end of the displacement path, the brackeless shifting can cause heavy impacts to take place when the inner circumference of the hollow cylinder butts against the cross head. This can be harmful to the roll and the load bearing construction. In particular, however, the inner peripheral area of the hollow cylinder can be damaged. This area is sued primarily as the contact surface for seals and can no longer fulfill this function when dents appear.

An especially fast displacement occurs, if a roll of the type in question, as is the case in German Patent No. 30 04 916, is the bottom roll of a calender featuring quick ventilation. If, in this connection, the paper web tears or another malfunction occurs, the calendar must be quickly opened. This means that the rolls must be separated from each other by an amount of several millimeters. This occurs in German Patent No. 30 04 916, in which the hollow cylinder of the bottom roll is lowered very quickly opposite the cross head by an amount corresponding to the sum of the nips. The liquid in the cylinders of the individual supporting elements is drawn off through a large flow cross section. However, before an end stop is reached, this hydraulic fluid flowing out of the individual cylinders is increasingly throttled, so that a smooth braking of the dropping movement is assured.

The effectiveness of this braking action is tied to the function of the throttle device in the control system of the calender If this throttle device breaks down, or if somewhere a pipe in the liquid guideway bursts or becomes leaky, the hollow cylinder will drop with full speed toward the crosshead and can crash into it violently. A single occurrence of this type can ruin the hollow cylinder.

Thus, there is a need to effect a more reliable damping of the radial movement of the hollow cylinder towards the crosshead.

SUMMARY OF THE INVENTION

In a roll of the type described above, this is fulfilled with the present invention by providing a forced damping device which is active independently of the control system of the supporting device, and by means of which forced damping device, the radial movement of the hollow cylinder toward the crosshead is braked before contact is made.

The present invention is not bound to the particular construction of the supporting device of German Patent No. 30 04 916. For example, according to the German Patent No. 10 26 609, it is also possible to design the roll as a so called swimming roll, whereby a semicylindrical, saucershaped, sealed longitudinal chamber is formed between the crosshead and the inner circumference of the hollow cylinder. This longitudinal chamber can be filled with hydraulic fluid, which braces the hollow cylinder from the inside in the direction of the roll nip.

The present invention can also be useful for rolls, in accordance with the German Patent No. 14 61 066, in which the supporting device is formed by pistons with lands, which are guided in the crosshead. The pistons with lands are supported by a liquid film, which is formed when the hollow cylinder turns.

The present invention is not even limited to having its bracing action accomplished by a hydraulic fluid, which is directly contiguous on the inner circumference of the hollow cylinder, as is the case in both of the previously mentioned examples. Supporting systems, which are completely or partially mechanical, can also be considered. An example of this is depicted in U.S. Pat. No. 2,395,915.

A device is understood as a "forced damping device" when, based on its own geometric form and independently of the construction and function of the supporting device, it becomes active any time the hollow cylinder definitely approaches the crosshead.

The hollow cylinder opposite the crosshead has a radial movement to be damped, whose direction can vary. However, by far the most predominant case is certainly movement in a vertical direction, because many rolls are mounted in superposed roll arrangements. Together with a roll arranged above or below, the rolls form roll nips, through which a web is passed substantially horizontally. What is of most concern among these vertical moving directions is the dropping movement of the hollow cylinder toward the crosshead when a supporting force is reduced or fails to appear. Due to the considerable weight of the hollow cylinder, as mentioned, an especially effective damping of the approach movement is required here. However, lateral moving directions are by no means excluded from the problem.

In the case of all of these movements, the forced damping device, according to the present invention, prevents the hollow cylinder from crashing too violently into the crosshead or into a stop element, which is connected to the crosshead, for example, on the supporting elements or the rim bearings, to intercept the axial displacement of the crosshead and the hollow cylinder.

In the case of rolls in which an element which is movable radially towards the inner circumference of the hollow cylinder and which transmits the supporting forces on to the hollow cylinder, is provided as, for example, in the case of the hydrostatically supported rolls in the form of supporting plungers and in the case of the "Crown Roll", according to the German Patent No. 14 61 066 in the form of the horizontal support bar, it is advisable that the forced damping device be movably connected to the respective element.

The movement of the hollow cylinder toward the crosshead takes place, in this connection, parallel to the moving direction of the "element", which automatically carries out a corresponding movement, which can be utilized to generate the damping effect, which is required.

Since the hollow cylinder is an elongated component, the formation of the forced damping device such as to have several damping elements distributed over the length of the hollow cylinder, is advantageous. Generally, each individual damping element will only have dimensions which are small compared with the length of the hollow cylinder.

In the case of a first illustrated embodiment of the invention, the damping elements can be integrated with movable elements distributed over the length of the hollow cylinder.

These types of elements are, for example, the supporting elements which are provided in hydrostatically, internally supported rolls.

In an alternative illustrated embodiment, the damping elements can be separate elements. Depending on the direction of action of a hydrostatically, internally supported roll, for example, these damping elements are arranged between the hydrostatic supporting elements or on the back side of the crosshead.

What comes to mind first and foremost as damping elements are liquid filled displacement elements with throttled discharge, whereby the movement of the hollow cylinder towards the crosshead causes the liquid to be displaced out of the damping element. As a result of the throttling action, the damping effect is produced.

In many applications, the main concern will be to brake the dropping movement of the hollow cylinder toward the crosshead, caused by the weight of the hollow cylinder. The simplest design of a refinement of the damping element as a displacement element is arranging the damping element on the top side of the Crosshead.

The illustrated embodiment of the invention has a damping element with a cup-shaped cylinder, which is initially open to the top. The hydraulic fluid in the clearance space between the cross head and the hollow cylinder has access to this cylinder. The space may be completely filled with hydraulic fluid. Alternatively, the space is only partially filled and there is turbulence during operation. In any case, it is guaranteed that the cylinder is always filled with hydraulic fluid and that, when the hollow cylinder approaches the crosshead, the piston plunging into the cylinder seals a liquid volume and pressurizes it under the weight of the hollow cylinder and/or other forces. The "flowoff paths" can have structurally different designs. For example, the piston can have a certain clearance with the cylinder jacket, so that the hydraulic fluid in the cylinder is forced out between the piston and the cylinder jacket. At the appropriate location, choke bores can be provided, as well, through which the hydraulic fluid from the cylinder, closed by the piston, can escape. It is equally possible to have several of these types of constructions at the same time.

Due to the fact that the cylinder automatically fills up with hydraulic fluid, an actual forced damping device is given, which performs its damping action automatically. This means that it does not depend on the function of any control system or the existence of any hydrostatic pressures.

A damping element featuring a cylinder, which is initially open to the top, can be integrated into a supporting device, which comprises radially movable sealing elements.

In many cases, rolls of the type in question are mounted in calendars and similar roll devices, which must have a high speed ventilator, in case a tear should occur in the web or the like. For this purpose, the damping device should not become active right from the start, otherwise, it would possibly prevent the roll nips from opening quickly in case of an emergency. Therefore, the hollow cylinder of a roll designed as the bottom roll of a calender or the like should initially be able to sink unhindered. The damping device should only become active after the initial dead travel segment has been covered.

BRIEF DESCRIPTION OF THE DRAWINGS

FIG. 1 schematically depicts, partly in longitudinal section, a pair of rolls provided with sealing elements constructed according to the principles of the invention;

FIG. 2 shows, in a slightly enlarged scale, a transverse cross sectional view of the pair of rolls taken along the line II—II of FIG. 1;

FIG. 3 shows a view corresponding to FIG. 1 of another pair of rolls of the invention in which the sealing elements of the invention are provided in the bottom roll;

FIG. 4 shows a transverse cross sectional view taken along line IV—IV of FIG. 3 in a slightly enlarged scale;

DETAILED DESCRIPTION

Figure 5:
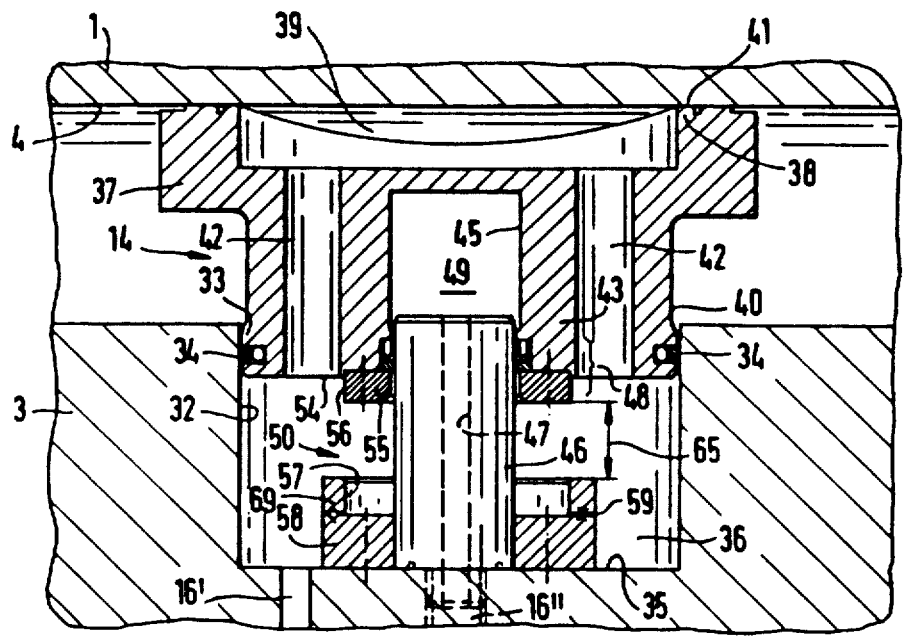
FIG. 5 shows a partial longitudinal section through a single sealing element with an integrated damping device of FIG. 1.

The roll arrangement depicted in FIGS. 1-2 comprises a bottom roll 10 and a top roll 100, which together form a roll nip 31 through which a textile web 30 of fabric or other material is conducted for pressure treatment of the web. The bottom roll 10 may be a conventional solid roll, while the top roll 100 comprises a rotating hollow cylinder 1, whose outer surface 2 forms the working roll circumference, and a stationary crosshead 3 extending lengthwise through the cylinder. The stationary crosshead 3 is spaced from the inner circumference 4 of the hollow cylinder 1, thereby forming an annular clearance space therewith, so that the crosshead can bend inside the hollow cylinder 1 without coming into contact with the inner circumference 4.

The journals 21 of the bottom roll 10, along with the ends 5 of the crosshead 3, which protrude from the ends of the hollow cylinder 1, are supported in a cylinder stand by suitable loading supporting devices (not shown) in a manner known in the art.

The ends of hollow cylinder 1 may be rotatably supported on the crosshead 3 by means of bearings (not shown in FIGS. 1-2) in a manner known in the art. Alternatively, and in a manner also known in the art, the hollow cylinder 1 may be supported on the crosshead 3 for movement in the active plane of the roll, i.e., in the plane connecting the axes of both rolls 10 and 100 that lies parallel to the plane of the drawing in FIG. 1. Thus, with this type of support arrangement cylinder 1 can move radially, as a whole, in this plane relative to the crosshead 3.

The clearance space 6 between the crosshead 3 and the inner circumference 4 of the hollow cylinder 1 is sealed at its ends by transverse end seals (not shown) and may be filled with hydraulic fluid via a supply line 7. The fluid can then flow from space 6 to the supply tank 9 via a line 8. A relief valve 11, mounted in line 8, ensures that a predetermined pressure is maintained in the clearance space 6. The supply line 7 discharges fluid from pump 12 into the clearance space 6 at the left end of the roll in FIG. 1, while the return line 8 conducts fluid from space 6 at the right end of the roll to tank 9. In this manner, a flow results in the longitudinal direction of the clearance space that may be used to control the temperature of the hollow cylinder 1, if the hydraulic fluid is used to influence temperature. The hydraulic fluid returned to the supply tank is pressurized by pump 12, which, as mentioned above, is connected to the supply line 7.

The pressure in the hollow cylindrical clearance space 6 would be uniform throughout, if it had no partitions whatsoever. Thus, if no additional measures were taken, the pressure in space 6 would not exert any net force on the hollow cylinder 1 that would lead to a displacement of the cylinder or cause it to exert a force in the active plane. In this state, the hollow cylinder 1 is simply "inflated" by the pressure in the space 6, without showing any other outwardly visible effects.

This uniform pressure distribution is disrupted by zones 13 formed in the hollow cylinder 1 on the side remote from the roll nip 31. The pressure prevailing in the space 6 is not conducted to these zones, whose linear extent is indicated by small brackets. The embodiment of FIGS. 1-2 has six of these Zones, but this number may be varied.

The Zones 13 are formed by annular sealing elements 14, Which are movably guided in cylinder bores 15 disposed on the top side of the crosshead 3. The front surface of the sealing elements is appropriately designed to conform with the inner circumference 4 of the hollow cylinder 1 to seal thereagainst when the front surface abuts the inner circumference 4. Each of the cylinder bores 15 is connected via a branch line with one of several supply lines 16 (FIG. 2) and, by way of these supply lines, With a controlling system 17, which may contain regulatory valves and the like. The supply lines 16, schematically depicted, are actually double lines, each of which comprises two separate supply lines 16',16" through which the sealing element 14 may be supplied with two hydraulic fluids, which are independent of each other and are supplied by the control system 17, as described subsequently in greater detail. In this manner, the pressure in zones 13 can be maintained by the pressure in the pressure chambers, which are formed in the annular sealing elements 14 and are open to the inner circumference 4 of the hollow cylinder 1.

In a first mode of operation, the pressure in zones 13 is lower than the pressure in the space 6 and can be independently controlled in the individual sealing elements 14, or in groups of sealing elements 14, in accordance with the number of supply lines 16 provided. In the simplest case, the control device 17 may connect zones 13 directly with the supply tank 9 such that the zones 13 are virtually pressureless. In this manner, "holes" or "empty spaces", in which the pressure in space 6 does not prevail in zones 13, exist in the otherwise uniformly pressurized clearance space 6. This causes the force exerted by the fluid contained in the space 6 to become uneven. Imaginary zones 18 formed on the diametrically opposite side of cylinder 1 oppose zones 13, relative to the meridian plane of the roll 100, i.e., the longitudinal central plane of the roll 100 or of the crosshead 3 that is perpendicular to the plane of the drawing in FIG. 1. Within these imaginary zones 18, again indicated by small brackets in FIG. 1, the full pressure prevails in the clearance space 6. Since no pressure or only a reduced pressure in the zones 13 opposes the pressure in zones 18, the total effect of the existence of the zones 13 is, for the most part, the same as if a pressure was exerted locally on the bottom side of the crosshead 3. In other words, the effect is the same as if pressure was exerted in zones 18, which corresponds to the pressure in the space 6 and strives to shift the hollow cylinder 1 downward according to FIG. 1, relative to the crosshead 3, i.e., toward the roll nip 31. Therefore, although in roll 100 of FIG. 1, the sealing elements 14 are arranged on the top side of the crosshead 3, the net force is exerted downward This is achieved by the basic principle of using a clearance space 6 that has no longitudinal seals and is completely filled, i.e., filled with hydraulic fluid under a uniform pressure, except for a predetermined number of zones, which are at a reduced pressure.

In FIG. 1, two additional pressure pistons 19 arranged on the bottom side of the crosshead 3 are also depicted These pistons can exert a positive force against the bottom side of the inner circumference 4 of the hollow cylinder 1. A pump 20 supplies pistons 19 with hydraulic fluid. Of course, the pressure that supplies the pressure pistons 19 may be drawn from pump 12 instead. Since the pressure pistons 19 are only accessory elements, which enable the line pressure distribution produced by the zones 13 to be optionally modified, they are represented, along with their supply lines and pump 20, with dash-dot lines.

In a second mode of operation, a pressure greater than the pressure in the space 6 can be supplied to the sealing elements 14 by suitable regulatory valves, pumps, etc., in the controlling system 17. In this mode, the hollow cylinder 1 of the roll 100 experiences a force, which according to FIGS. 1-2 is directed upwardly and tends to pull the cylinder away from the roll nip 31. Therefore, this mode of operation can be used to open the roll nip 31, for example, to introduce a new web 30.

To close the roll nip 31, the pressure is removed from line 16", whereby the sealing elements 14 descend into the crosshead 3 and the hollow cylinder 1 drops relative to the crosshead 3. If this dropping movement occurs too quickly or even if the line 16" breaks, the hollow cylinder 1 will strike the bottom roll 10 with a considerable impact, or if this bottom roll should happen to be lowered, it will strike the top side of the crosshead 3. Both cases can cause damage to the illustrated roll arrangement. For this reason, a forced damping device is integrated with the sealing elements 14 of FIG. 1 and 2. This will be described in detail later based on FIG. 5.

In the roll arrangement of FIGS. 3-4 the roll of the invention is the bottom roll 200. The reference numerals in FIGS. 3-4 are the same for the corresponding parts described in FIGS. 1-2. The bottom roll 200 of FIGS. 3-4 comprises, in the same manner as the top roll 100 of FIGS. 1-2, a hollow cylinder 1, which rotates about a crosshead 3'. This hollow cylinder 1 works against a top roll 10 and exerts a pressure on a fabric web 30 in the roll nip.

However, contrary to the roll of FIGS. 1-2, in this embodiment, longitudinal seals 24 are provided at opposite sides of the crosshead 3 at its widest point relative to active plane W. Seals 24 extend from one transverse end seal of the roll 200 to the other to divide the clearance space between the crosshead 3' and the inner circumference 4 of the hollow cylinder 1 into two semi-cylindrical shaped spaces 6' and 6". The space 6', situated on the side of the roll nip, can be filled with hydraulic fluid by the pump 12 via the line 7. This hydraulic fluid is returned via a line 8' and a relief valve 11 to the supply tank 9. The hydraulic fluid in the space 6', whose pressure can be predetermined by the relief valve 11, exerts a generally uniform force against the roll nip 31 and, thus, directly contributes to the generation of the line pressure in the nip. Any fluid or seepage flowing past the longitudinal gaskets 24 is conducted to the space 6", which is almost pressureless or at only a slight pressure.

To be sure, additional sealing elements 14' are depicted in the embodiment of FIG. 3 and 4, however, these elements can be omitted as well. The supporting device, which exerts the pressure against the inner circumference 4 of the hollow cylinder 1 and, for its part, is supported on the crosshead 3', is then provided in the sealing arrangement comprising the longitudinal gaskets 24 and in the hydraulic fluid filled, semicylindrical, saucershaped upper clearance space 6'.

When the hydraulic fluid is discharged quickly out of this space 6', so that the roll nip 31 will open, or also if an exterior pipe bursts, the hollow cylinder 1 will drop with a corresponding speed in the active plane toward the top side of the crosshead 3'. To avoid a collision in this case, a forced damping device is provided for the roll 200, which, in the illustrated embodiment, includes two damping elements 60 near the ends of the hollow cylinder 1 on the crosshead 3' and arranged on the top side of this crosshead. They will be described later in detail based on FIG. 6.

In another embodiment, the longitudinal gaskets 24 can also be omitted and, in their place, the sealing elements 14', designed as supporting plungers, can be provided. In operation, they press the hollow cylinder 1 upwards against the roll nip 31 and form the line pressure. Also, in the case of this type of construction of the supporting device, if the pressure prevailing under the individual sealing elements 14' suddenly drops, this will be followed by the sudden sinking of the hollow cylinder 1, which must be braked by the damping elements 60.

In another embodiment, the longitudinal gaskets 24 and the sealing elements 14' can be present at the same time.

The uniform pressure exerted in the space 6, is disrupted by the sealing elements 14', which in this embodiment are arranged on the side of crosshead adjacent the roll nip. The sealing elements 14' make it is possible to adjust the pressure in the zones 23 via the supply lines 26 to either a value that is reduced relative to the space 6', or a value that is increased relative to the space 6, This is accomplished by means of the controlling system 27 via which the pressure chambers in the sealing elements 14' can be selectively connected with the supply tank 9 via the line 25, so that virtually no pressure or only a predetermined reduced pressure prevails inside of the sealing elements, or with the pump 22, so that a pressure that is increased relative to the pressure in the space 6' can be supplied to the pressure chambers of sealing elements 14'. In this manner, the sealing elements 14' exert a positive pressure, which is greater than the pressure of the hydraulic fluid in the space 6', against the inner circumference of the hollow cylinder 1 at zones 23. Although FIGS. 3-4 schematically depict supply lines 26, these lines 26 may also be designed as double lines comprised of separate supply lines 26',26" through which separate hydraulic fluids can be supplied to the sealing elements 24.

Therefore, in the embodiment of FIGS. 3-4 as well, the sealing elements 14 have two modes of operation. However, contrary to the embodiment of FIGS. 1-2 in which the hollow cylinder 1 is pressed against the roll nip 31 in one mode, while being pulled away from the nip in the other mode, in this embodiment in the pressure within the zones 23 is modified locally by the sealing elements 14' such that the line pressure distribution is influenced, but in any event, a line pressure does exist because of seals 24 and pressureless space 6". If the pressure in the sealing elements 14' is lower than the pressure in the space 6', "holes" are formed in the uniform pressure distribution. However, if the pressure in elements 14' is greater, then a positive supplementary pressure, which surpasses the pressure in the space 6', is exerted in the zones 23. In the former case, the sealing elements act as "underpressure elements", while in the second case they function as "overpressure elements".

In the case of all three variants, which are possible with respect to the roll 200 depicted in FIG. 3 and 4, when the pressure in the semicylindrical, space 6' and- /or in the sealing element 14' is evacuated, the hollow cylinder 1 drops toward the top side of the crosshead 3' and requires a damping action before reaching the limit position of this movement.

As is apparent from FIG. 5, the sealing element 14 comprises a cylindrical, piston or ram-like housing 40, which is seated with clearance in a cylindrical bore 32 of the crosshead 3. On its lower end, according to FIG. 5, it has an edge 33, which projects up to the diameter of the cylindrical bore 32, and there, it is sealed by a circular piston ring type gasket 34 during the lifting movement of the sealing element 14 in the axial direction of the cylindrical bore 32. A cylinder chamber 36 is formed on the bottom or back side of the sealing element 14, between this sealing element and the base 35 of the cylindrical bore 32. This cylindrical chamber 36 can be filled with hydraulic fluid through a partial supply line 16'. On the top end, the cylindrical housing 40 features a circular projection 37, and a flat pressure chamber 39, defined by a closed circular rim 38, is recessed on the top side of the sealing element 14, turned toward the inner circumference 4 of the hollow cylinder 1. In the illustrated embodiment, this flat pressure chamber has a circular boundary and in practice has a diameter of 80 to 320 mm and a depth of several millimeters. At the same time, the circular rim 38 forms the contact surface 41 of the sealing element 14 on the inner circumference 4 of the hollow cylinder 1.

In its cross section, the sealing element 14 is not closed, but rather cut through from the back side up to the pressure chamber 39 by a traversing duct 42, which has a large lateral section. The housing 40 of the sealing element 14 has a concentric, cylindrical midsection 43. Conditional on the large cross section of the ducts 42, the pressure in the partial supply lines 16' or in the cylinder chamber 36 is also present in the pressure chamber 39 and acts in its lateral section against the inner circumference 4 of the hollow cylinder 1. This pressure can be greater or less than the pressure in the surrounding space 6.

A cylinder bore 45, which is closed on the top, is placed in the cylindrical midsection 43. A piston 46, which is screwed tightly to the base 35 of the cylinder chamber 36 and which has a longitudinal bore 47 connected to the partial supply line 16'', engages in this cylinder bore 45. A sealing arrangement 48 in the lower area of the midsection 43 seals the piston 46 toward the cylinder bore 45. Above the piston 46, a cylinder volume 49 is formed, which is connected over radial ducts with rim chambers, not shown here, formed in the contact surface 41 of the rim 38. These rim chambers are enclosed all around by the rim 38 and are open toward the inner circumference 4 of the hollow cylinder 1. They provide for uniform contact between the sealing element 14 and the inner circumference 4 of the hollow cylinder 1.

As already mentioned, the roll 100 possesses a forced damping device, which comprises damping elements, which are integrated into the individual sealing elements.

When, in the case of the sealing element 14, the pressure in the supply lines 16' or 16'' is evacuated, the sealing element 14 will be rapidly pressed, under the Weight of the hollow cylinder 1, into the cylindrical bore 32 and possibly, with the bottom side of the circular projection, hit the top side of the crosshead 3 quite violently. The inner circumference 4 of the hollow cylinder 1 could also come to a seating position on some stop element. Since the hollow cylinder 1 generally still turns at that point, it could be damaged due to friction.

To prevent such events from taking place, the damping elements 50 are provided, which comprise a cylindrical ring 55 on the outer circumference 56, screwed to the bottom side 54 of the housing 40', surrounding the piston 46. At the same time, this ring retains the sealing arrangement 48. Furthermore, a cylinder 58, screwed to the base 35 of the cylinder chamber 36, is also included. This cylinder 58 is open to the top and its inner peripheral area 57 has a slightly larger diameter than the outer peripheral area 56. The cylinder 58 surrounds the piston 46 in the same way as the ring 55. When the sealing element 14 drops, the ring 55 plunges piston-like into the cylinder 58. The trapped hydraulic fluid can only flow out between the cylinder surfaces 56, 57 or through additionally installed choke bores 59, whereby a damping effect ensues. The opening of the cylinder 58 to the top assures that the hydraulic fluid contained therein comes to a standstill, even if the cylinder chamber 36 is to be partially evacuated. The amount of time that passes between the time when the pressure is removed from the cylinder chamber 36 until the ring 55 plunges into the cylinder 58 is so short, that it does not allow any significant quantity to run out of any possibly existing choke bores 59. To facilitate the lifting of the sealing element 14', nonreturn valves 69 can be arranged in the choke bores 59, as depicted in the choke bore 59 to the left in FIG. 5. It is important that the damping device show an initial dead travel segment 65 (FIG. 5). This means that the sealing element 14 can initially sink freely by the amount 65 in the top side of the crosshead 3, until the damping device 50 begins its braking action. The braking action begins only when the ring 55 has reached the top side of the cylinder 58. In this way, it is possible to quickly ventilate a roll used, for example, as a bottom roll in a calender, by the amount 65. Thus, the end position is still reached without harmful impact.

Clearly, the damping device of FIG. 5, integrated into the supporting device, which is designed as a sealing element, is not dependent on the special construction of the damping element 14. The damping device could be used in the same way, if the sealing element did not contain any through ducts 42 with a large cross section, but instead contained choke bores, and, also, if the piston 46 were not provided. Then, the ring 55 would, of course, be a closed disk. It is also understood, that the interacting parts 55,58 of the damping element 70 do not need to be separate parts, but can rather be formed equally by a corresponding design of the bottom side of the sealing element 14 or of the base 35 of the cylindrical bore 32.

Figure 6:
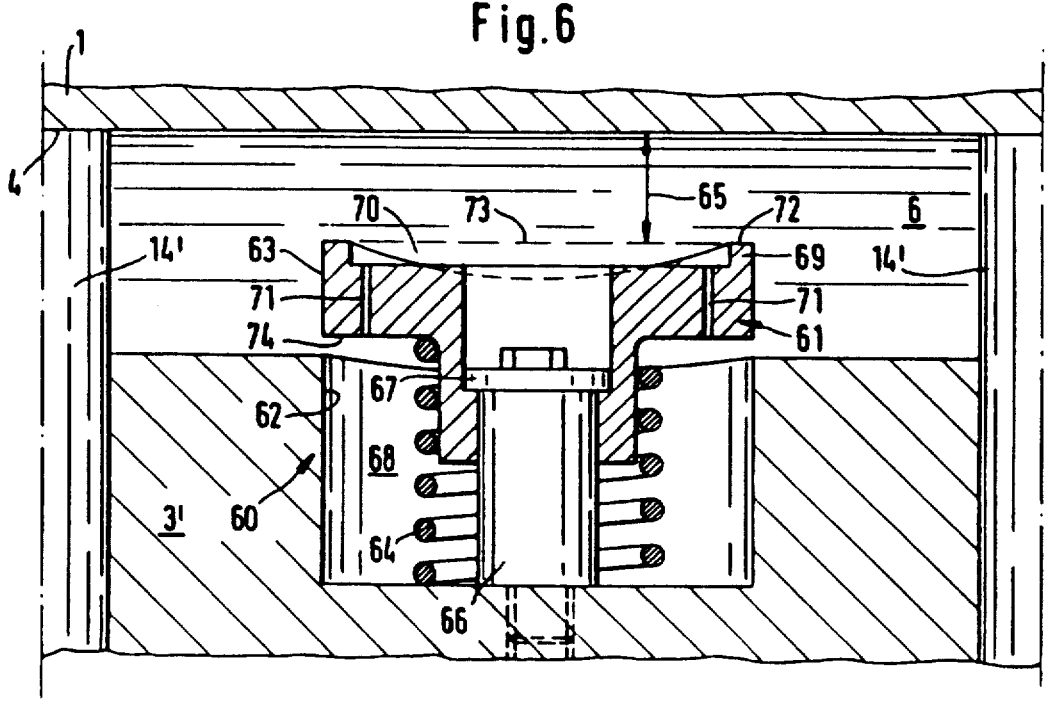
FIG. 6 shows a view corresponding to FIG. 5 through a damping element separate from the sealing elements.

A damping element 60 is depicted in FIG. 6, which is not integrated into the supporting device, but rather is provided separately from the sealing elements 14' (which sealing elements can be of various designs) and, to be precise, on the top side of the crosshead 3, between adjacent sealing elements 14'. In the illustrated embodiment, only two damping elements 60 are provided near the extremities of the hollow cylinder 1, but, of course, it is possible to have more of these types of damping elements 60.

Also, in the case of the damping element 60, a cylinder 68 is provided, which is formed by a closed, that is cup-shaped cylindrical bore 62 introduced in the top side of the crosshead 3'. A contact piece 61 is movable in the axial direction on a shaft 66, which is arranged coaxially to the cylindrical bore and is screwed in the base of the cylindrical bore 62. This contact piece 61 has a cylindrical construction in its upper section 63 and a slightly smaller diameter than the cylindrical bore 62. A helical compression spring 64, which surrounds one of the shafts 66, acts between the bottom side of the contact piece 61 and the base of the cylindrical bore 62. It presses the contact piece 61 upwards, as shown in FIG. 6. The upward movement of the contact piece 61, under the force of the spring 64, is restricted by the disk 67 screwed on the top side of the shaft 66. In the limiting position, the bottom side 74 of the contact piece 61, situated in one radial plane, lies with clearance above the topside of the crosshead 3', so that, in the way which is apparent from FIG. 6, the hydraulic fluid contained in the interspace 6, has access to the cylinder 68 and this cylinder 68 is constantly filled with hydraulic fluid.

The top side of the contact piece 61 is adapted to the inner circumference 4 of the hollow cylinder 1 and comprises a flat recess 70, which is surrounded by a rim 69. Choke bores 71 emanate from this recess 70 and lead to the bottom side 74 of the contact piece 61.

When the sealing elements 14' suddenly sink inwardly, due to a reduction in pressure, the inner circumference 4 of the hollow cylinder 1 initially covers a distance 65, which can be significant for the quick ventilation. After that, it comes to a seating position on the contact surface 72 on the top side of the rim 69 and, under the weight of the hollow cylinder 1, it presses the contact piece 61 downwards, whereby after a short beginning distance, this contact piece plunges into the cylinder 68. The hydraulic fluid contained therein is displaced and flows off, in a throttled state, between the cylinder surfaces 62,63. The dropping movement is thereby damped. The choke bores 71 can be provided to supply hydraulic fluid from the cylinder 68 to the chamber 70. After this chamber is filled, the hydraulic fluid effects a certain hydrostatic bracing of the hollow cylinder 1, during the lowering and deceleration of the same.

As indicated by the dotted line 73, the top side of the contact piece 61 can also be constructed Without the chamber 70 and form a smooth pressure shoe, whose shape is adapted to the inner circumference 4 of the hollow cylinder 1. The hydraulic fluid collected from the inner circumference 4 forms a bearing film on this pressure shoe, and the hollow cylinder 1 can be adequately supported on this bearing film during deceleration.

As is apparent from FIG. 6, in normal operation, the contact piece 61 does not abut against the inner circumference 4 of the hollow cylinder 1, but does so only when this hollow cylinder drops too far toward the top side of the crosshead 3'. It is understood, that the sealing elements 14, are designed so that they do not come to a seating position anywhere, before the contact piece 61 has reached the inner circumference 4 of the hollow cylinder 1 and the damping element 60 is able to exert its damping effect.

What is claimed is:

1. In a roll having a rotatable hollow cylinder with an inner circumference, which forms an outer working roll circumference, and a stationary crosshead extending through said hollow cylinder lengthwise and leaving clearance all around with respect to the inner circumference of the hollow cylinder, a supporting device, with a control system, radially supporting the hollow cylinder on the crosshead in an active plane, the hollow cylinder being radially movable as a whose with respect to the crosshead, the improvement comprising:
    a forced damping device separate from said hollow cylinder braking radial movement of the hollow cylinder after an initial dead travel segment and before contact can be made with the crosshead, said forced damping device being active independently the control system of the supporting device and said dead travel segment being at least one order of magnitude greater than hundredths of a millimeter.

2. The roll of claim 1, wherein said supporting device comprises at least one element which is mounted on the crosshead and is radially movable toward the inner circumference of the hollow cylinder and wherein said forced damping device is movably connected to said element.

3. The roll of claim 2, wherein said forced damping device comprises several damping elements, which are separate from each other and are distributed over the length of the hollow cylinder.

4. The roll of claim 3, wherein said at least one element comprises several movable elements and each of said damping elements are integrated into one of said movable elements, which are distrusted over the length of the hollow cylinder.

5. The roll of claim 4, wherein said damping elements comprise liquid filled displacement elements with throttled discharge.

6. The roll of claim 5, wherein said damping elements are arranged on a top side of the crosshead.

7. The roll of claim 6 wherein, in operation, the clearance between the crosshead and the hollow cylinder is at least partially filled with hydraulic fluid and wherein a damping element comprises a piston, a cylinder, which is initially open to the top, into which said piston plunges, during the radial movement of the hollow cylinder toward the crosshead, and means to throttle of the hydraulic fluid displaced out of the cylinder.

8. The roll of claim 7, wherein said at least one element comprises piston-like sealing elements arranged in radial cylinder chambers of the crosshead, distributed over the length of the hollow cylinder, and wherein said cylinder of said damping element is disposed in one of said cylinder chambers and said piston is disposed on a bottom side of one of the piston-like sealing elements arranged in said cylinder chamber.

9. The roll of claim 1, wherein said forced damping device comprises several movable damping elements, which are separate from each other and are distributed over the length of the hollow cylinder.

10. The roll of claim 9, wherein said damping elements comprise liquid filled displacement elements with throttled discharge.

11. The roll of claim 10, wherein said damping elements are arranged on the top side of the crosshead.

12. The roll of claim 11 wherein, in operation, the clearance between the crosshead and the hollow cylinder is at least partially filled with hydraulic fluid and wherein a damping element comprises a piston, a cylinder, which is initially open to the top, into which said piston plunges, during the radical movement of the hollow cylinder toward the crosshead, and means to throttle the hydraulic fluid displaced out of the cylinder.

13. The roll of claim 12, wherein said supporting device comprises piston-like sealing elements arranged in radial cylinder chambers of the crosshead, distributed over the length of the hollow cylinder, and wherein said cylinder of said damping element is disposed in one of said cylinder chambers and said piston is disposed on a bottom side of one of the piston-like sealing elements arranged in said cylinder chamber.

14. The roll of claim 13, wherein said damping elements are separate from said supporting device.

15. The roll of claim 1, wherein said forced damping device comprises several damping elements which are separate from said supporting device.

16. The roll of claim 15, wherein said damping elements comprise liquid filed displacement elements with throttled discharge.

17. The roll of claim 18, wherein said damping elements are arranged on the top side of the crosshead.

18. The roll of claim 17, wherein said supporting device comprises piston-like sealing elements arranged in radial cylinder chambers of the crosshead, distributed over the length of the hollow cylinder, and wherein said cylinder of said damping element is disposed in one of said cylinder chambers and said piston is disposed on a bottom side of one of the piston-like sealing elements arranged in said cylinder chamber.

* * * * *

UNITED STATES PATENT AND TRADEMARK OFFICE
CERTIFICATE OF CORRECTION

PATENT NO. : 5,140,731
DATED : August 25, 1992
INVENTOR(S) : Bernhard Brendel

It is certified that error appears in the above-indentified patent and that said Letters Patent is hereby corrected as shown below:

| Column | Line | |
|---|---|---|
| 1  | 47 | Change "this" to --the--. |
| 1  | 53 | Change "sued" to --used--. |
| 3  | 58 | Change "Crosshead" to --crosshead--. |
| 5  | 52 | Change "Zones" to --zones--. |
| 5  | 55 | Change "Which" to --which--. |
| 5  | 63 | Change "With" to --with--. |
| 6  | 46 | After "depicted" insert --.--. |
| 6  | 49 | Change "of" to --Of--. |
| 8  | 4  | Change "space 6" to --space 6'--. |
| 8  | 10 | Change "space 6" to --space 6'--. |
| 10 | 64 | Change "interspace 6" to --interspace 6'--. |
| 9  | 44 | Change "Weight" to --weight--. |
| 10 | 38 | Change "3" to --3'--. |
| 11 | 21 | Change "Without" to --without--. |
| 11 | 48 | Change "whose" to --whole--. |
| 12 | 4  | Change "distrusted" to --distributed--. |

UNITED STATES PATENT AND TRADEMARK OFFICE
CERTIFICATE OF CORRECTION

PATENT NO. : 5,140,731
DATED : August 25, 1992
INVENTOR(S) : Bernhard Brendel

It is certified that error appears in the above-indentified patent and that said Letters Patent is hereby corrected as shown below:

Column      Line 12          58            Change "18" to --16--.

Signed and Sealed this

Nineteenth Day of October, 1993

Attest:

BRUCE LEHMAN

Attesting Officer     Commissioner of Patents and Trademarks